US008000242B2

(12) United States Patent
Wang et al.

(10) Patent No.: US 8,000,242 B2
(45) Date of Patent: Aug. 16, 2011

(54) REDUCING PACKET LOSS FOR A PACKET DATA SERVICE DURING CONGESTION IN A TRANSPORT NETWORK

(75) Inventors: Xin Wang, Parsippany, NJ (US); Yang Yang, Parsippany, NJ (US); Lily H. Zhu, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 598 days.

(21) Appl. No.: 11/428,958

(22) Filed: Jul. 6, 2006

(65) Prior Publication Data
US 2008/0008092 A1 Jan. 10, 2008

(51) Int. Cl.
*H04J 1/16* (2006.01)
(52) U.S. Cl. ..... 370/235; 370/229; 370/230; 370/230.1; 370/231; 370/236; 709/230; 709/232; 709/235
(58) Field of Classification Search .................. 370/235, 370/431, 437, 229; 709/232, 235, 230
See application file for complete search history.

(56) References Cited

U.S. PATENT DOCUMENTS

| 6,285,665 B1 * | 9/2001 | Chuah ............................ 370/319 |
| 7,151,762 B1 * | 12/2006 | Ho et al. ........................ 370/338 |
| 7,385,920 B2 * | 6/2008 | Zhang et al. .................. 370/229 |
| 7,472,311 B1 * | 12/2008 | Chu et al. ......................... 714/30 |
| 2002/0193118 A1 * | 12/2002 | Jain et al. ...................... 455/453 |
| 2004/0196860 A1 | 10/2004 | Gao et al. ........................ 370/437 |
| 2005/0078603 A1 * | 4/2005 | Turner et al. .................. 370/235 |
| 2006/0109786 A1 * | 5/2006 | Abdel-Kader et al. ....... 370/232 |
| 2006/0159016 A1 * | 7/2006 | Sagfors et al. ................ 370/230 |
| 2006/0233110 A1 * | 10/2006 | Yang et al. .................... 370/237 |
| 2007/0248013 A1 * | 10/2007 | Sridharan et al. ............ 370/235 |

OTHER PUBLICATIONS

Hassan S: "TCP-friendliness of rate-based congestion congtrol protocols" Communications, 2003. APCC 2003. The 9th Asia-Pacific Conference on Sep. 21-24, 2003, Piscataway, NJ, USA, IEEE, vol. 1, Sep. 21, 2003, pp. 248-252, XP010688182.*
International Search Report and Written Opinion mailed Jan. 2, 2008. XP010688182—Hassan, S., "*TCP—Friendliness of Rate-Based Congestion Control Protocols*", Communications, 2003. APCC 2003. The 9th Asia-Pacific Conference on Sep. 21-24, 2003, Piscataway, NJ, USA, IEEE, vol. 1, Sep. 21, 2003 pp. 248-252.

* cited by examiner

*Primary Examiner* — Hassan Kizou
*Assistant Examiner* — Siming Liu
(74) *Attorney, Agent, or Firm* — Williams, Morgan & Amerson, P.C.

(57) ABSTRACT

A method and an apparatus for reducing packet loss for a packet data service during congestion in a transport network are provided. The method comprises measuring a packet loss rate over a time period in one or more flows of data traffic packets associated with the packet data service to determine whether the one or more flows of data traffic packets are experiencing a variation in a desired traffic performance level at a particular time duration during the congestion in the time period. The method further comprises triggering a request to reduce a flow rate of at least one of the one or more flows of data traffic packets based on the packet loss rate if the at least one of the one or more flows of data traffic packets experiences the variation in the desired traffic performance level. By using a distributed transport congestion control, for example, only such Best Effort data traffic packet flows that generate bursty traffic at a specific moment of congestion sense the congestion and thus trigger an associated rate reduction action. However, other flows that do not experience the congestion may not be affected.

14 Claims, 3 Drawing Sheets

REDUCING PACKET LOSS FOR A PACKET DATA SERVICE DURING CONGESTION IN A TRANSPORT NETWORK

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to different users or subscribers of wireless communication devices. The wireless communication devices may be mobile or fixed units and situated within a geographic region across one or more wireless networks. The users or subscribers of wireless units or communication devices, such as mobile stations (MSs) or access terminals or user equipment may constantly move within (and outside) particular wireless networks.

A wireless communications system generally includes one or more base stations (BSs) that can establish wireless communications links with wireless units. Each wireless unit has an active set, which comprises a set of base stations with which it may communicate. Base stations may also be referred to as node-Bs or access networks. To form the wireless communications link between a wireless unit and a base station, the wireless unit accesses a list of available channels (or carriers) broadcast by the base station.

Wireless services, such as packet data services, especially general packet data services, including general packet data applications are becoming popular among technology savvy consumers. Despite advances in computing and networking, transporting network traffic generally depends upon real-time network performance for many packet data services. Typically, a data network is deployed to transport network traffic associated with a variety of packet data services, such as voice and video services involving interaction from users. However, an increasing number of packet data services, and other services, impose user demands on the data network usage for transportation of service traffic. These user demands, such as Quality of Service (QoS) requirements, may be expressed in terms of throughput and end-to-end delay.

For the purposes of providing such general packet data services, including general packet data applications, in a wireless network (or even in a wireline network), a base station that provides network access support on a Radio Access Network (RAN) is typically connected to other network components via backhaul facilities, such as a T1 line, E1 line or Ethernet. A Radio Access Network generally manages radio access resources including a forward link (FL) radio frequency (RF) resource, a reverse link (RL) RF resource, and resources of a backhaul transport network. That is, one of the resource bottlenecks that may impact service performance includes backhaul resources. For a general packet data service, it includes both the application throughput and service response time.

On a transport network, such as a data transport network, a general packet data service is typically referred to as "Best Effort" traffic due to the absence of any specific end-to-end performance requirements. Although performance of such a service may suffer a gradual degradation with a prolonged packet delay and/or increases in packet loss, a general packet data service may usually be treated with a relatively lower priority than Quality of Service (QoS) desiring services, such as real-time multi-media applications. Therefore, when a backhaul facility becomes congested, the best effort data packets associated with the general packet data service may be delayed or dropped first depending on a specific implementation of a transport component along a packet transmission path. Furthermore, since many general packet data applications may typically involve bursty traffic, the likelihood of the best effort data packets experience a buffer overflow during network congestion is far greater than other types of traffic.

On the other hand, most packet data applications utilize a Transmission Control Protocol/Internet Protocol (TCP/IP) protocol suite. The TCP protocol has a built-in congestion detection and avoidance mechanism which is triggered by a packet loss indication or an excessive end-to-end packet delay beyond a normally estimated value. When the TCP congestion control mechanism is triggered, the TCP reduces the service rate immediately and exponentially. A recovery process, on the other hand, takes much longer time. As a result, TCP-based data application performance is very sensitive to packet loss during the network congestion periods. Accordingly, when a data transport network is temporarily congested due to traffic burstiness (e.g., data traffic burstiness or higher priority QoS traffic burstiness), network packet loss from the best-effort data traffic and TCP time-out may cause a significant application performance degradation.

Generally, for a transport network including a plurality of transport nodes, the transport network congestion is detected by measuring performance of aggregate traffic, such as a measurement of an aggregate traffic packet loss rate may be detected. This approach has several drawbacks for a QoS system:

1. With different QoS per-hop-behavior configurations in the transport nodes along the transport path, it is difficult to derive a particular QoS class traffic performance from the aggregate packet loss.
2. By using only an aggregate traffic performance metric, it is difficult to determine the level of traffic reduction desired in a bursty traffic mix scenario.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one illustrative embodiment of the present invention, a method of reducing packet loss for a packet data service during congestion in a data transport network is provided. The method comprises measuring a packet loss rate over a time period in one or more flows of data traffic packets associated with the packet data service to determine whether the one or more flows of data traffic packets are experiencing a variation in a desired traffic performance level at a particular time duration during the congestion the time period. The method further comprises triggering a request to reduce a flow rate of at least one of the one or more flows of data traffic packets based on the packet loss rate if the at least one of the one or more flows of data traffic packets experiences the variation in the desired traffic performance level.

In another illustrative embodiment of the present invention, an apparatus for reducing packet loss for a packet data service during congestion in a data transport network is provided. The apparatus comprises a detector disposed in a radio access network portion of the data transport network. The detector to measure a packet loss rate over a time period in one or more flows of data traffic packets associated with the packet data service to determine whether the one or more flows of data traffic packets experiencing a variation in a desired traffic performance level at a particular time duration during the congestion the time period. The detector to further trigger a request to reduce a flow rate of the at least one of the one or more flows of data traffic packets based on the packet loss rate, if at least one of the one or more flows of data traffic packets experiences the variation in the desired traffic performance level.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method is provided for reducing packet loss for a packet data service during congestion in the data transport network including an access network, for example, a Radio Access Network (RAN) by controlling congestion of Best Effort (BE) packets. As used herein, in one embodiment, the Best Effort packets may be treated independently, i.e., each packet may be stamped with the addresses of the receiver and the transmitter such that routing decisions may be made on a packet-by-packet basis. Unlike other data service congestion control mechanisms in which congestion in a transport network is detected via aggregate traffic performance measurement, such as aggregate traffic packet loss rate, distributed congestion detection and relief schemes are provided. Only such traffic flows that generate bursty traffic at a specific moment of congestion sense the congestion and thus trigger an associated rate reduction action. Other flows that do not experience the congestion may not be affected. As used herein, in one embodiment, since data flows in general involve a timed delivery, a packet that does not arrive at a target within a time window may be regarded as a packet loss. In one embodiment, a method comprises measuring a packet loss rate over a time period in one or more flows of data traffic packets associated with the packet data service to determine whether the one or more flows of data traffic packets are experiencing a variation in a desired traffic performance level at a particular time duration during the congestion in the time period. The method further comprises triggering a request from a Radio Network Controller (RNC) so that the data may be temporarily buffered during backhaul congestion to reduce a flow rate of at least one of the one or more flows of data traffic packets based on the packet loss rate if the at least one of the one or more flows of data traffic packets experiences the variation in the desired traffic performance level. An apparatus to reduce packet loss for a packet data service during congestion in a data transport network may comprise a detector disposed in a radio access network portion of the data transport network. For example, when the data transport network temporarily experiences congestion due to traffic burstiness (e.g., data traffic burstiness or higher priority Quality of Service (QoS) traffic burstiness), a congestion controller may minimize network packet loss from the Best Effort (BE) data traffic and a Transmission Control Protocol (TCP) time-out to substantially avoid a performance degradation of a general packet data application. A customer may control a congestion trigger threshold as well as congestion detection window such that a desired QoS performance of the data transport network may be tailored to match a specific customer service and/or objective. By quickly adapting a bursty data traffic rate, the packet loss during transport network congestion intervals may be minimized, as the flows with data bursts during those periods may be affected. In this way, an end-to-end performance degradation may be kept to a given minimum level. Accordingly, a distributed transport congestion control may provide a relatively fast response and minimize the overall packet loss in the data transport network so that Best Effort data traffic may cope with short-term transport congestion due to traffic burstiness or QoS enforcement. In one embodiment of the present invention, the distributed transport congestion control may reduce packet loss on backhaul because of a higher layer protocols' reaction to the packet loss.

Figure 1:
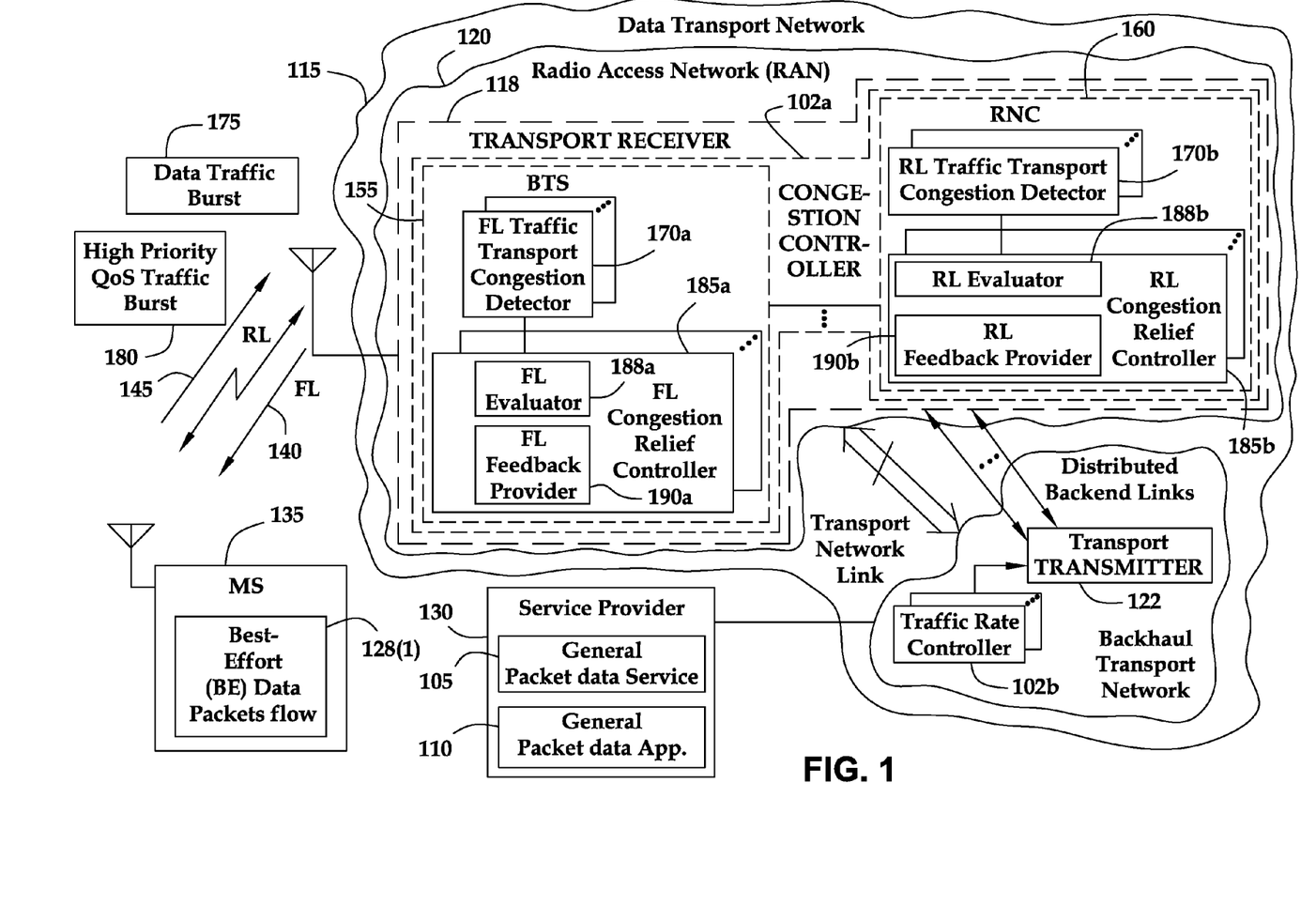
FIG. 1 schematically depicts a communication system in which a congestion controller may reduce packet loss for a packet data service during congestion in a data transport network that includes an access network, such as a Radio Access Network (RAN) and a backhaul transport network according to one illustrative embodiment of the present invention.

Referring to FIG. 1, a communication system 100 is illustrated in which a congestion controller 102a and a traffic rate controller 102b may be distributed in a data transport network 115 to reduce packet loss for a general packet data service 105 and/or a general packet data application 110 during congestion according to one illustrative embodiment of the present invention. By detecting congestion of Best Effort (BE) packets associated with a data service or a non-real time application, in one embodiment, the congestion controller 102a and the traffic rate controller 102b may reduce an overall packet loss across the Best Effort packets to provide the data service or non-real time application without significantly degrading the service or application performance to an end user. As used herein, in one embodiment, the general packet data service 105 may be a Best Effort data delivery service that guarantees a Quality of Service (QoS) on a packet-by-packet basis.

Consistent with one embodiment of the present invention, the data transport network 115 may include an access network, such as a Radio Access Network (RAN) 120 and a backhaul transport network 125. To reduce an overall packet loss across Best Effort packets in one or more flows of data traffic packets 128, at the Radio Access Network 120, a transport receiver 118 may include the congestion controller 102a that detects congestion in the backhaul transport network 125. Likewise, for controlling congestion of Best Effort packets, a transport transmitter 122 at the backhaul transport network 125 may include the traffic rate controller 102b to reduce a traffic rate in at least one flow of data traffic packets 128.

According to one illustrative embodiment, a service provider 130 coupled to the backhaul transport network 125 may provide the general packet data service 105 and/or the general packet data application 110 to an end user. While the general packet data service 105 may be a packet-based best effort service, examples of the general packet data application 110 include digital media and entertainment applications that may deliver non-real time data over the data transport network 115. As one example, the backhaul transport network 125 of the data transport network 115 may be a wireless backhaul network.

In the communication system 100, a mobile station (MS) 135 associated with an end user may wirelessly communicate with the service provider 130 over the Radio Access Network (RAN) 120 and the backhaul transport network 125 in accordance with one embodiment of the present invention. The Radio Access Network 120 may manage radio access resources including a forward link (FL) 140 radio frequency (RF) resource, a reverse link (RL) 145 RF resource, and resources of the backhaul transport network 125. For example, the backhaul transport network 125 may comprise backhaul facilities, such as a T1 line, E1 line and/or Ethernet, which may be expensive to provision.

The Radio Access Network 120 may comprise a plurality of Base Transceiver Stations (BTSs) 155 (1-m) coupled to a Radio Network Controller (RNC) 160. To provide network access support on the Radio Access Network 120, each Base Transceiver Station 155 may be coupled to the service provider 130 via the backhaul transport network 125. For the purposes of reducing packet loss during congestion for an end user of the general packet data service 105, the congestion controller 102a may be distributed at the Base Transceiver Station 155 and the Radio Network Controller 160. In this way, a first controller, such as the congestion controller 102a may be distributed across one or more flows of data traffic packets 128 to trigger an indication of congestion relief for controlling congestion of Best Effort (BE) packets. Likewise, a second controller, such as the traffic rate controller 102b may be distributed across the one or more flows of data traffic packets 128 to reduce a traffic rate in at least one of the flows of data traffic packets for controlling congestion of Best Effort (BE) packets.

To detect the congestion in the backhaul transport network 125, the congestion controller 102a, in one illustrative embodiment, may comprise a first detector portion, i.e., a FL traffic backhaul congestion detector 170a disposed in the Base Transceiver Station 155 to detect backhaul congestion in forward link (FL) traffic on the FL 140 to the mobile station 135. The congestion controller 102a may further comprise a second detector portion, i.e., a RL traffic backhaul congestion detector 170b disposed in the Radio Network Controller 160 to detect backhaul congestion in reverse link (RL) traffic on the RL 145 from the mobile station 135 to the Base Transceiver Station 155.

In operation, the FL traffic backhaul congestion detector 170a and the RL traffic backhaul congestion detector 170b, in one illustrative embodiment, may detect congestion in the backhaul transport network 125 to control congestion of a Best Effort (BE) of data packets flow 128(1) of an end user at the mobile station 135. Thus, when the data transport network 115 experiences congestion due to traffic burstiness (e.g., data traffic burst 175 or higher priority Quality of Service (QoS) traffic burst 180), the congestion controller 102a may minimize packet loss from the Best Effort (BE) of data packets flow 128(1) to substantially avoid a performance degradation of the general packet data application 110. Additionally, the congestion controller 102a may minimize a Transmission Control Protocol (TCP) time-out to significantly reduce a performance degradation of the general packet data application 110.

Consistent with one embodiment, the congestion controller 102a, as shown in FIG. 1, may further comprise a FL congestion relief controller 185a disposed in the Base Transceiver Station 155. The FL congestion relief controller 185a may be distributed across the one or more BE flows 128 to trigger an indication of congestion relief in traffic on the forward link 140 to the mobile station 135 for controlling congestion of Best Effort packets. When the backhaul transport network 125 of the data transport network 115 is a wireless backhaul network, for example, the FL congestion relief controller 185a may be executed at the Base Transceiver Station 155, a RL congestion relief controller 185a may be executed at the Radio Network Controller 160. For controlling congestion of Best Effort packets, the RL congestion relief controller 185b may be distributed across the one or more flows 128 to trigger an indication of congestion relief in traffic on the reverse link 145 to the mobile station 135.

In accordance with one illustrative embodiment, the FL congestion relief controller 185a may comprise a FL evaluator 188a and a FL feedback provider 190a. Likewise, the RL congestion relief controller 185a may comprise a RL evaluator 188b and a RL feedback provider 190b. The FL evaluator 188a may periodically evaluate a packet loss rate of each flow of Best Effort data traffic packets 128 at the transport receiver 118. By using a feedback control loop the FL feedback provider 190a may feedback a desired level of the flow rate reduction to the transport transmitter 122 for the traffic rate controller 102b associated with at least one flows of data traffic packets. The traffic rate controller 102b may be distributed across one or more flows to reduce a traffic rate in at least one flow of data traffic packets.

In operation, the service provider 130 may enable access to the general packet data application 110 and/or the general packet data service 105 by exchanging messages with the mobile station 135 over the data transport network 115. For example, the service provider 130 may enable an integrated data access to a set of digital wireless services for a subscriber over the data transport network 115.

Consistent with one embodiment, the mobile station 135 may transmit messages to the data transport network 115 over the reverse link 145. In the communication system 100, a wireless communication between the Radio Access Network 120 and the mobile station 135 may occur over an air interface via a radio frequency (RF) medium that may use a code division multiple access (CDMA) protocol to support multiple users. The forward link 140 may provide messages including traffic packets and signaling messages to the mobile station 135.

The Radio Access Network 120 may provide the wireless connectivity to the mobile station 135 according to any desirable protocol. Examples of such a protocol include a Code Division Multiple Access (CDMA, cdma2000) protocol, an Evolved Data Optimized (EVDO, 1XEVDO) protocol, a Universal Mobile Telecommunication System (UMTS) protocol, a Global System for Mobile communications (GSM) protocol, and the like.

Examples of the mobile station 135 may include a host of wireless communication devices including, but not limited to, cellular telephones, personal digital assistants (PDAs), and global positioning systems (GPS) that employ the communication system 100 to operate in the data transport network 115, such as a cellular or mobile data network. Other examples of the mobile station 135 may include smart phones, text messaging devices, and the like. The mobile station 135 may encompass additional features and applications than typically available on a conventional cellular phone. Examples of different features and applications include e-mail service, Internet access, audio-video interfaces for music and media content streaming.

Figure 2:
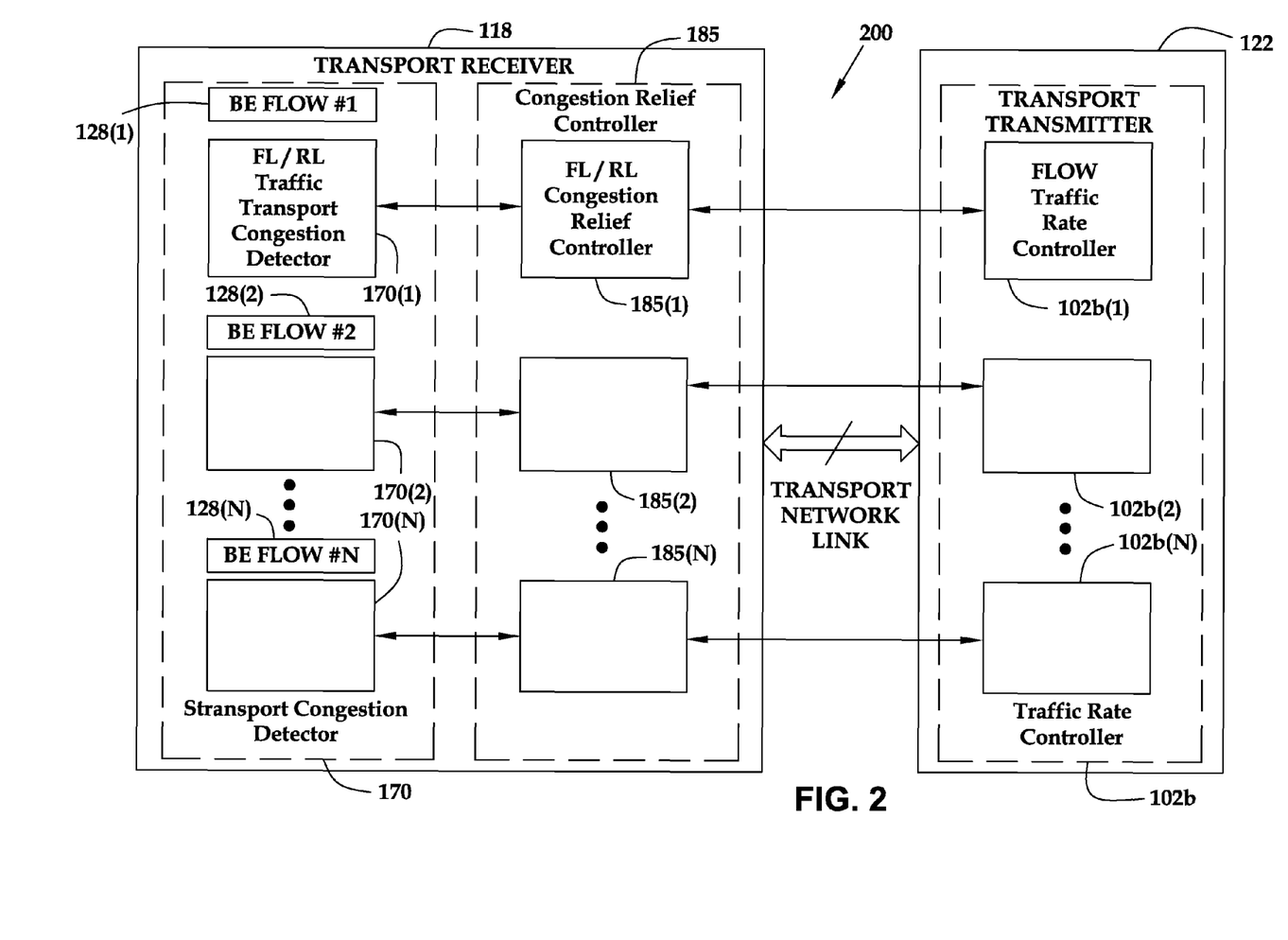
FIG. 2 illustrates a stylized representation of a congestion control platform that distributes a congestion detector and a congestion relief controller in the data transport network shown in FIG. 1 in accordance with one illustrative embodiment of the present invention.

Referring to FIG. 2, a stylized representation of a congestion control platform 200 that distributes the congestion detector 102a, the FL and RL congestion relief controllers 185a, 185b in the data transport network 115 shown in FIG. 1 is depicted according to one illustrative embodiment of the present invention. Based on the congestion control platform 200, a transport congestion detector 170 may be distributed in a receiving end of the data transport network 115, such as within the Radio Access Network 120 as a plurality of FL/RL transport congestion detectors 170(1-N) across a plurality of Best Effort (BE) data traffic packets flows 128(1-N). Likewise, a congestion relief controller 185 may be distributed as a plurality of FL/RL congestion relief controllers 185(1-N) across the plurality of Best Effort data traffic packets flows 128(1-N). In this way, the congestion control platform 200 may enable the plurality of transport congestion detectors 170(1-N) and the plurality of congestion relief controllers 185(1-N) to independently detect congestion in the backhaul transport network 125 of the data transport network 115 across the plurality of Best Effort data traffic packets flow 128(1-N).

At the transport transmitter 122, the traffic rate controller 102b may be distributed as a plurality of traffic rate controllers 102b(1-N) across the plurality of Best Effort (BE) data traffic packets flow 128(1-N). A first traffic rate controller 102b(1) may reduce a traffic rate in a first Best Effort data traffic packets flow 128(1) independently from a second traffic rate controller 102b(2) that reduces a traffic rate in a second Best Effort data traffic packets flow 128(2). Each Best Effort data traffic packets flow 128(1-N) may individually detect an indication of backhaul congestion in traffic on the FL 140 and the RL 145. Additionally, each Best Effort data traffic packets flow 128(1-N) may use a corresponding congestion relief controller of the plurality of congestion relief controllers 185(1-N) to trigger an indication of congestion relief for controlling congestion of Best Effort packets.

Figure 3:
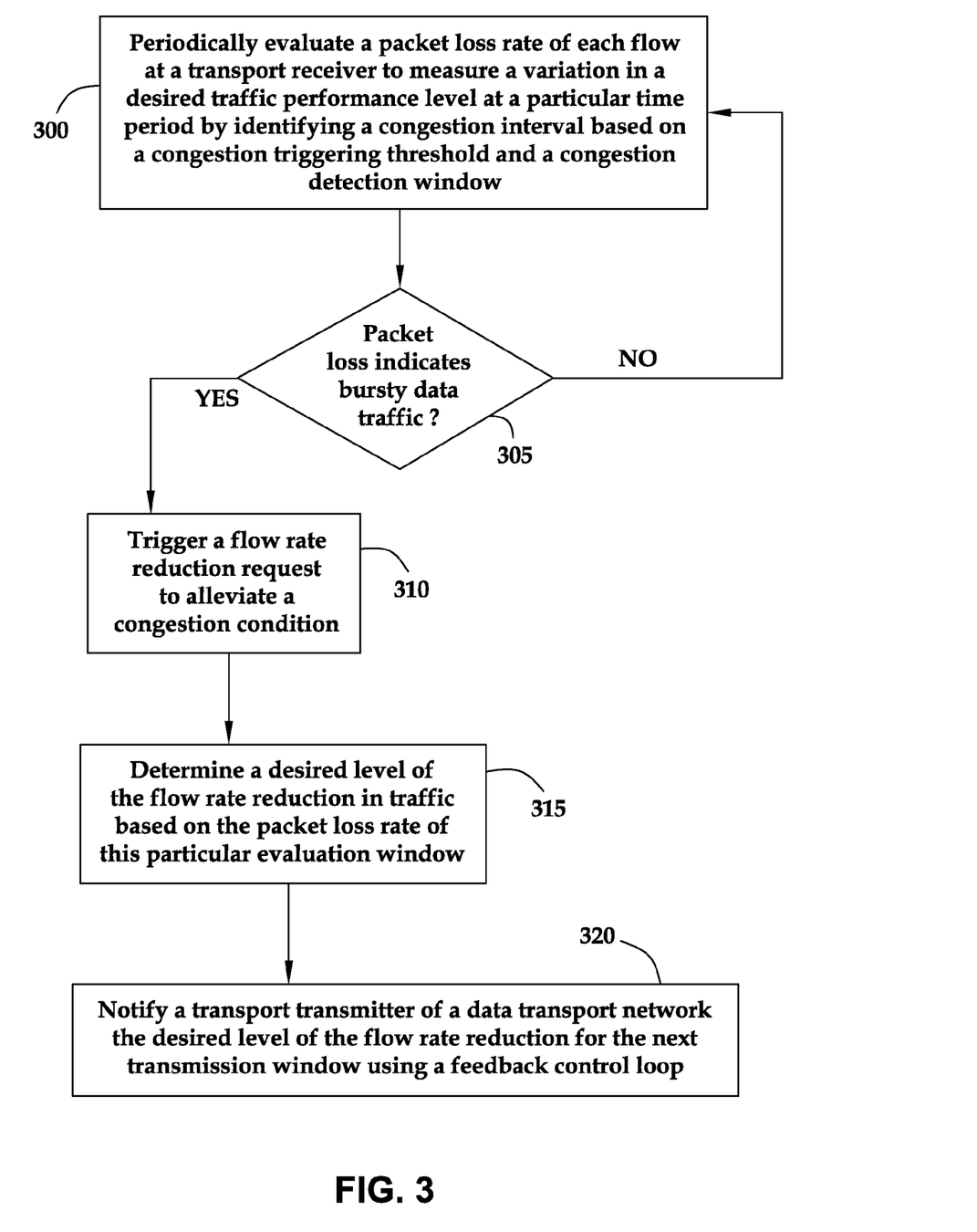
FIG. 3 depicts a stylized representation for implementing a method of reducing packet loss for a packet data service during congestion in the data transport network by controlling congestion of best-effort packets using the congestion control platform shown in FIG. 2 consistent with one exemplary embodiment of the present invention.

Turning to FIG. 3, consistent with one exemplary embodiment of the present invention, a stylized representation for implementing a method of reducing packet loss for the general packet data service 105 during congestion in the data transport network 115 by using the congestion control platform 200 shown in FIG. 2 is depicted. According to one exemplary embodiment of the present invention, to control congestion of the Best Effort packets associated with the general packet data service 105, the FL/RL traffic transport congestion detector 170(1) may periodically evaluate a first packet loss statistic, such as a packet drop or loss rate in the first Best Effort data traffic packets 128(1) within the data transport network 115, as indicated at block 300. By measuring a packet loss rate over a time period in the first Best Effort data traffic packets 128(1) associated with the general packet data service 105, the FL/RL traffic transport congestion detector 170(1) may determine whether the first Best Effort data traffic packets flow 128(1) is experiencing a variation in a desired traffic performance level at a particular time duration during the congestion in the time period. To measure the variation in a desired traffic performance level at a particular time duration during the congestion, the FL/RL traffic transport congestion detector 170(1) may identify a congestion interval in that particular time duration of the congestion based on a threshold and a window for the first Best Effort data traffic packets flow 128(1).

At a decision block 305, the FL/RL traffic transport congestion detector 170(1) may compare the packet loss rate to a triggering threshold associated with a congestion detection widow. If the packet loss rate exceeds the triggering threshold, the FL/RL traffic transport congestion detector 170(1) may indicate the variation in the desired traffic performance level in the first Best Effort data traffic packets flow 128(1). Conversely, the FL/RL traffic transport congestion detector 170(1) may continue to periodically evaluate the packet loss rate. In response to a determination that the first Best Effort data traffic packets 128(1) is experiencing such a variation in the desired traffic performance level, however, the first congestion relief controller 185(1) may trigger a request from the Radio Network Controller 160 so that the data may be temporarily buffered during backhaul congestion to reduce a flow rate of the first Best Effort data traffic packets flow 128(1) based on the indicated packet loss rate, as illustrated in block 310. For triggering the request to reduce a flow rate of the first Best Effort data traffic packets flow 128(1), the first congestion relief controller 185(1) may use a non-overlapping packet-based detection or transmission window of a given number of expected packets to optimize the packet loss rate for alleviating a congestion condition.

In one embodiment, the FL/RL traffic transport congestion detector 170(1) may receive the triggering threshold and the detection window from a subscriber of the general packet data service 105. Based on an indication for traffic burstiness and/or a quality of service (QoS) associated with a real-time multimedia service, the FL/RL traffic transport congestion detector 170(1) may obtain a desired service performance level for the general packet data service 105 on the data transport network 115 during the congestion interval.

At block 315, based on the packet loss rate, the first congestion relief controller 185(1) may determine a desired level of a flow rate reduction for the non-overlapping packet-based detection or transmission window at block 310 to cope with the bursty data traffic in the first Best Effort data traffic packets flow 128(1). At block 320, by using a feedback loop control, the first congestion relief controller 185(1) may notify the desired level of the flow rate reduction to the transport transmitter 122 in the data transport network 115 for a next detection or transmission window.

In this way, the transport receiver 118 may enable each individual Best Effort data traffic packets flow 128 to detect the transport congestion individually by measuring a packet loss rate to independently reduce a flow rate to a desired level.

For example, each Best Effort data traffic packets flow 128 may periodically evaluate its own packet loss/drop statistics along with the time, and use that packet loss rate as the metric to reduce a traffic rate during congestion. Consistent with one embodiment, by evaluating a reaction to the backhaul congestion, the first congestion relief controller 185(1) may decide on how much the transport transmitter 122 should reduce the traffic rate. By feedbacking a decision to the transport transmitter 122 of the backhaul transport network 125 to cause the FL/RL traffic transport congestion detector 170(1) to locally throttle the traffic rate. Accordingly, transport congestion detection may be performed by an individual BE data traffic packets flow 128 independently by monitoring the packet-level performance. For example, each BE data traffic packets flow 128 may evaluates its own packet loss/drop statistics along with the time, and uses the packet loss rate as the metric to determine whether the transport network experiences congestions.

In one embodiment, since the BE data traffic packets flows 128 may involve an in-sequence delivery, an out-of-order packet which does not arrive in a target window may be regarded as a packet loss as well. For example, a packet with excessive delay may also be regarded as a lost packet in the measurement of the packet loss rate. However, the packet loss rate may be optimized to fit a specific network. The following is an exemplary implementation of determining the packet loss rate:

$$PLR(n) = \frac{N\_Lost\_Pkts((n-1)K, nK)}{K},$$

where n is the index of a non-overlapping window of K expected packets. Because the packet inter-arrivals depend on the traffic characteristics and transport performance, use of a packet-based window may be more robust than a time-based window in some embodiments of the present invention.

When the detected packet loss rate of a BE data traffic packets flow 128 exceeds a predefined triggering threshold at a particular given time, it implies that the end-to-end TCP performance may be impacted if no action is taken. This condition thus triggers a flow rate reduction request to alleviate the congestion. Since the triggering threshold may be based on the TCP performance sensitivity over packet loss, such a trigger may be performance-oriented. However, the extent of a flow rate reduction may depend on a current packet loss situation. For example, a dense packet loss may indicate that the data traffic burst 175 is relatively high for the data transport network 115 to handle at the current moment of time or a particular time duration; therefore not only an immediate reduction of traffic flow rate may be desired but the rate reduction ought to be at a relatively higher rate. The following shows an exemplary implementation of the rate reduction in accordance with one embodiment of the present invention:

$$RR(n)=(1+\alpha)\max(PER(n)-Thr,0)$$

where $\alpha$ is the factor to control the degree of the rate reduction in face of bursty errors and Thr is the target.

Upon determining a desired rate reduction level, the transport receiver 118 may notify the transport transmitter 122 of the data transport network 115 the desired rate reduction for the next transmission window. Since a delay in the backhaul transport network 125 may be less than a delay of an end-to-end application, such as the general packet data application 110, the feedback control loop may react to the congestion relatively faster than the TCP. By quickly reacting to the congestion, the data transport network 115 may avoid a TCP congestion control to execute a response.

Accordingly, by quickly adapting a bursty data traffic rate, the packet loss during transport network congestion intervals may be minimized, as the Best Effort data traffic packets flows 128 with data bursts during those periods may be affected. In this way, an end-to-end performance degradation may be kept to a given minimum level. Since a distributed transport congestion control may provide a relatively fast response and minimize the overall packet loss in the data transport network 115, the Best Effort data traffic packets flows 128 overcome a short-term transport congestion associated with traffic burstiness or QoS enforcement.

In one embodiment, by using of the congestion control platform 200, a high-speed wireless data network may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of reducing packet loss for a packet data service in a data transport network, the method comprising:
    measuring, at a plurality of first controllers implemented in a receiver at one end of a network link between a base station and a radio network controller in the data transport network, a plurality of packet loss rates over a selected window, each packet loss rate being measured for one of a plurality of concurrent parallel flows of data traffic packets associated with said packet data service, the plurality of concurrent parallel flows travelling over the network link to the receiver;
    detecting congestion in at least one of the concurrent parallel flows of data traffic packets based on the measured packet loss rates; and
    independently triggering, using the plurality of first controllers, a reduction in a flow rate of each concurrent parallel flow of data traffic packets for which congestion is detected, wherein a plurality of second controllers implemented in a transmitter of said transport network is used for reducing an overall packet loss across best-effort packets in said one or more concurrent parallel flows of data traffic packets, each second controller being associated with one concurrent parallel flow.

2. A method, as set forth in claim 1, wherein triggering the reduction further comprises:
    detecting congestion for each concurrent parallel flow when the corresponding measured packet loss rate exceeds a triggering threshold in a detection window for best-effort packets in the concurrent parallel flow, said detection of congestion for each concurrent parallel flow being detected by a separate one of the plurality of first controllers implemented in the receiver.

3. A method, as set forth in claim 2, further comprising:
    receiving said triggering threshold and said detection window from a subscriber of said packet data service to obtain a desired service performance on said data transport network, said triggering threshold and said detection window being determined based on at least one of an indication for traffic burstiness and a quality of service (QoS) associated with a real-time multimedia service.

4. A method, as set forth in claim 3, wherein detecting the congestion comprises:
    using the plurality of first controllers implemented in the receiver of said data transport network at the base station and a radio network controller to detect congestion in a backhaul transport network portion of said data transport network for reducing the overall packet loss across best-effort packets in said one or more concurrent parallel flows of data traffic packets; and
    using the plurality of first controllers implemented in said receiver across best-effort packets in said one or more concurrent parallel flows of data traffic packets for triggering an indication of congestion relief, each first controller being associated with one concurrent parallel flow.

5. A method, as set forth in claim 4, wherein using the plurality of first controllers in a transport receiver of said data transport network further comprises:
   using said plurality of first controllers in a radio access network portion of said data transport network to control said congestion, wherein said backhaul transport network portion of said data transport network is a wireless backhaul network, wherein using said plurality of first controllers in a radio access network portion of said data transport network further comprises:
      using a first portion of said plurality of first controllers in said at least one base station coupled to said radio network controller to relieve backhaul congestion in traffic on a forward link to a mobile station; and
      using a second portion of said plurality of first controllers in said radio network controller to relieve backhaul congestion in traffic on a reverse link from said mobile station.

6. A method, as set forth in claim 1, wherein relieving the congestion further comprises:
   comparing each packet loss rate to a threshold associated with a congestion detection window; and
   if said packet loss rate exceeds said threshold, indicating that congestion exists for the corresponding concurrent parallel flow.

7. A method, as set forth in claim 6, wherein determining the plurality of packet loss rates further comprises:
   determining the plurality of packet loss rates using a non-overlapping packet-based window of a given number of expected packets to optimize said packet loss rate for alleviating a congestion condition.

8. A method, as set forth in claim 7, further comprising:
   determining a desired level of a flow rate reduction for bursty data traffic in the concurrent parallel flows of data traffic packets based on the corresponding packet loss rate.

9. A method, as set forth in claim 8, further comprising:
   notifying the transmitter of said data transport network the desired level of the flow rate reduction for a next transmission window.

10. A method, as set forth in claim 9, further comprising:
    using a feedback control loop to feedback the desired level of the flow rate reduction to said transmitter for a traffic rate controller of said at least one of said concurrent parallel flows of data traffic packets.

11. An apparatus for reducing packet loss for a packet data service during congestion in a data transport network, the apparatus comprising:
    a plurality of first controllers implemented in a receiver at one end of a network link between a base station and a radio network controller in the data transport network, wherein each first controller is configured to:
    measure one of a plurality of packet loss rates over a selected window, each packet loss rate being measured for one of a plurality of concurrent parallel flows of data traffic packets associated with said packet data service, the plurality of concurrent parallel flows travelling over the network link between the base station and the radio network controller,
    detect congestion in at least one of the concurrent parallel flows of data traffic packets based on the measured packet loss rates, and
    independently trigger a reduction in a flow rate of each concurrent parallel flow of data traffic packets for which congestion is detected, wherein a plurality of second controllers implemented in a transmitter of said transport network is used for reducing an overall packet loss across best-effort packets in said one or more concurrent parallel flows of data traffic packets, each second controller being associated with one concurrent parallel flow.

12. An apparatus, as set forth in claim 11, wherein said radio access network portion of said data transport network further comprises:
    said receiver at said base station and said radio network controller to detect congestion in a backhaul transport network portion of said data transport network for reducing the overall packet loss across best-effort packets in said one or more concurrent parallel flows.

13. An apparatus, as set forth in claim 12, wherein said plurality of first controllers further comprises:
    a first subset of the plurality of first controllers disposed in said at least one base station coupled to said radio network controller to relieve backhaul congestion in traffic on a forward link to a mobile station, each first subset being associated with one of the concurrent parallel flows; and
    a second subset of the plurality of first controllers disposed in said radio network controller to relieve backhaul congestion in traffic on a reverse link from said mobile station, each second subset being associated with one of the concurrent parallel flows.

14. An apparatus, as set forth in claim 12, wherein said receiver further comprises:
    one of the plurality of first controllers in the receiver being distributed across said one or more concurrent parallel flows to trigger an indication of congestion relief for controlling congestion of best-effort packets.

* * * * *